Feb. 19, 1935.  E. F. DOLAN  1,991,924
CAMERA
Filed Feb. 7, 1934  4 Sheets-Sheet 1
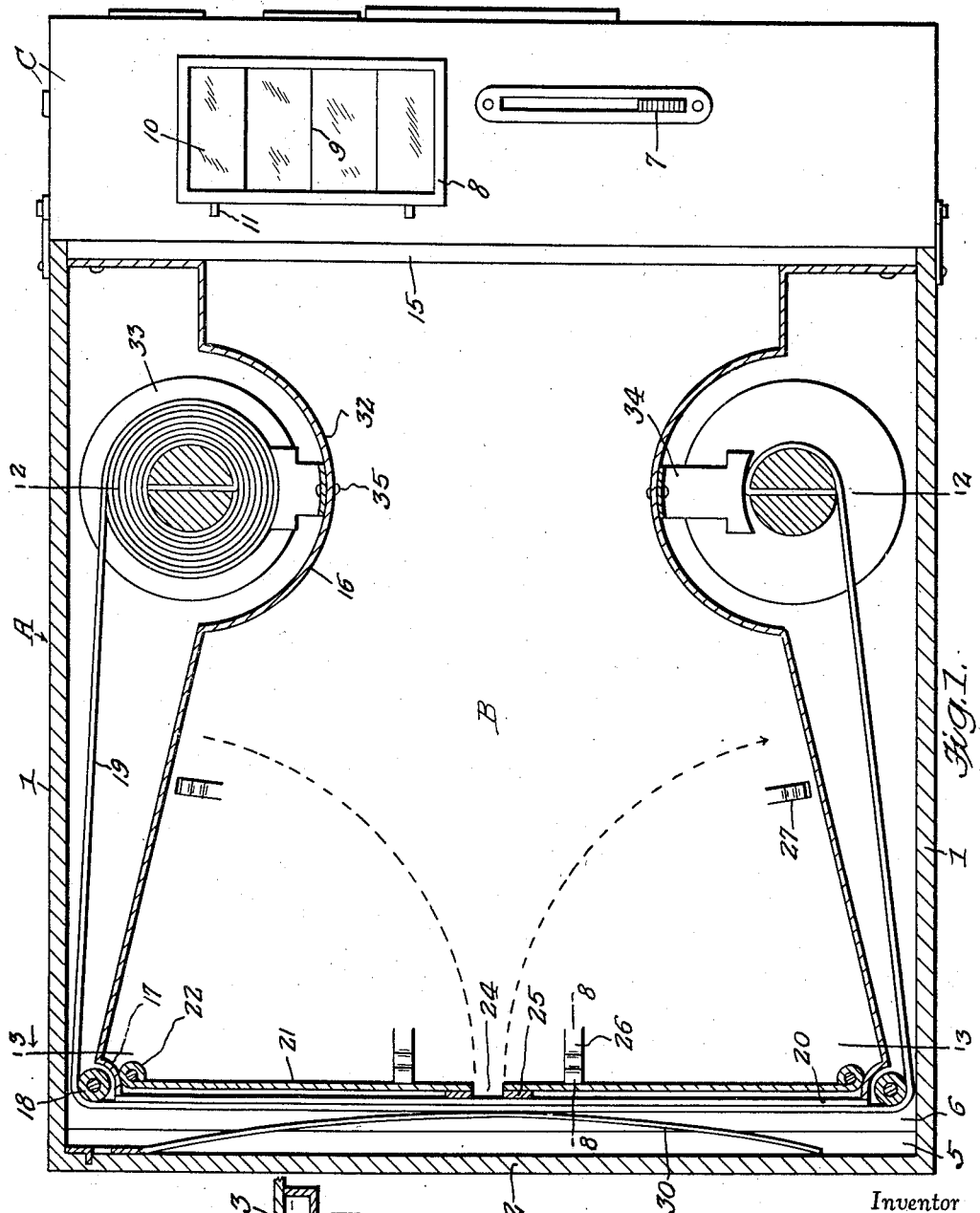
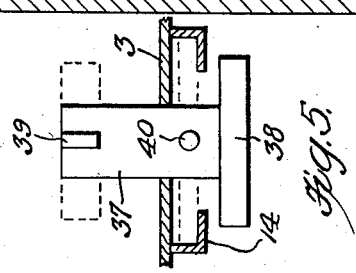
Inventor
Edward F. Dolan,
By Clarence A. O'Brien
Attorney

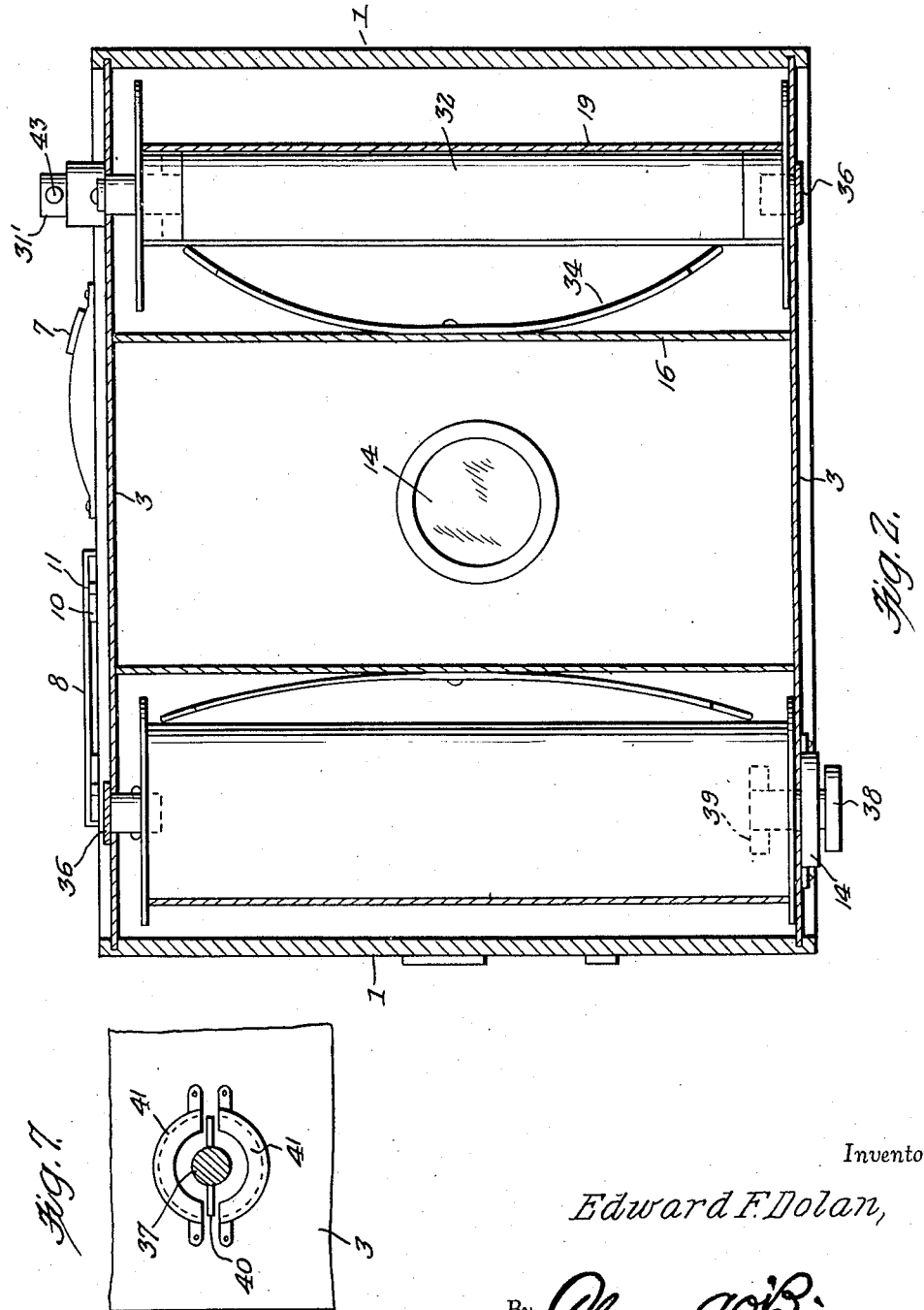

Feb. 19, 1935.  E. F. DOLAN  1,991,924
CAMERA
Filed Feb. 7, 1934  4 Sheets-Sheet 3
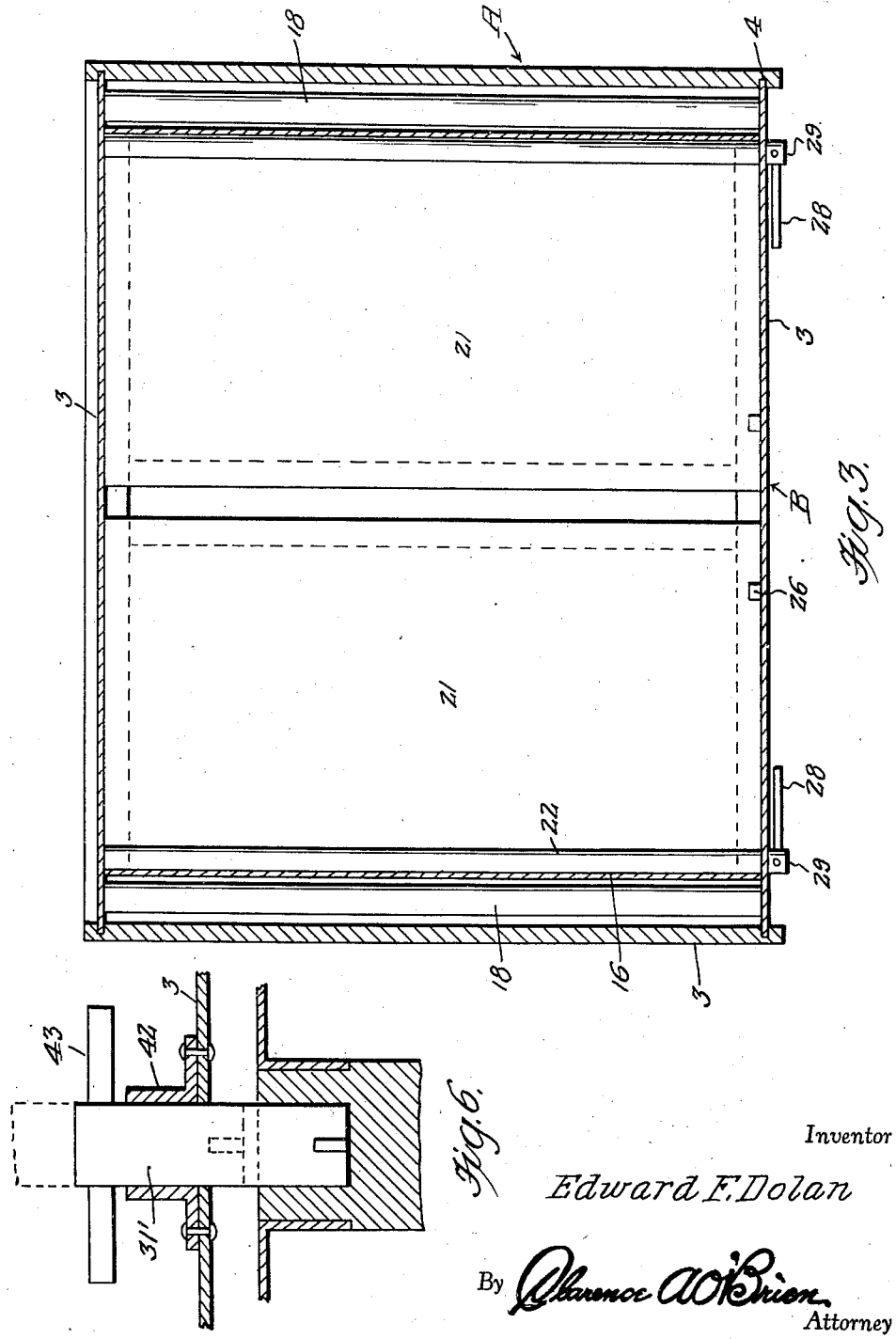
Inventor
Edward F. Dolan
By Clarence A. O'Brien
Attorney Feb. 19, 1935.  E. F. DOLAN  1,991,924
CAMERA
Filed Feb. 7, 1934  4 Sheets-Sheet 4
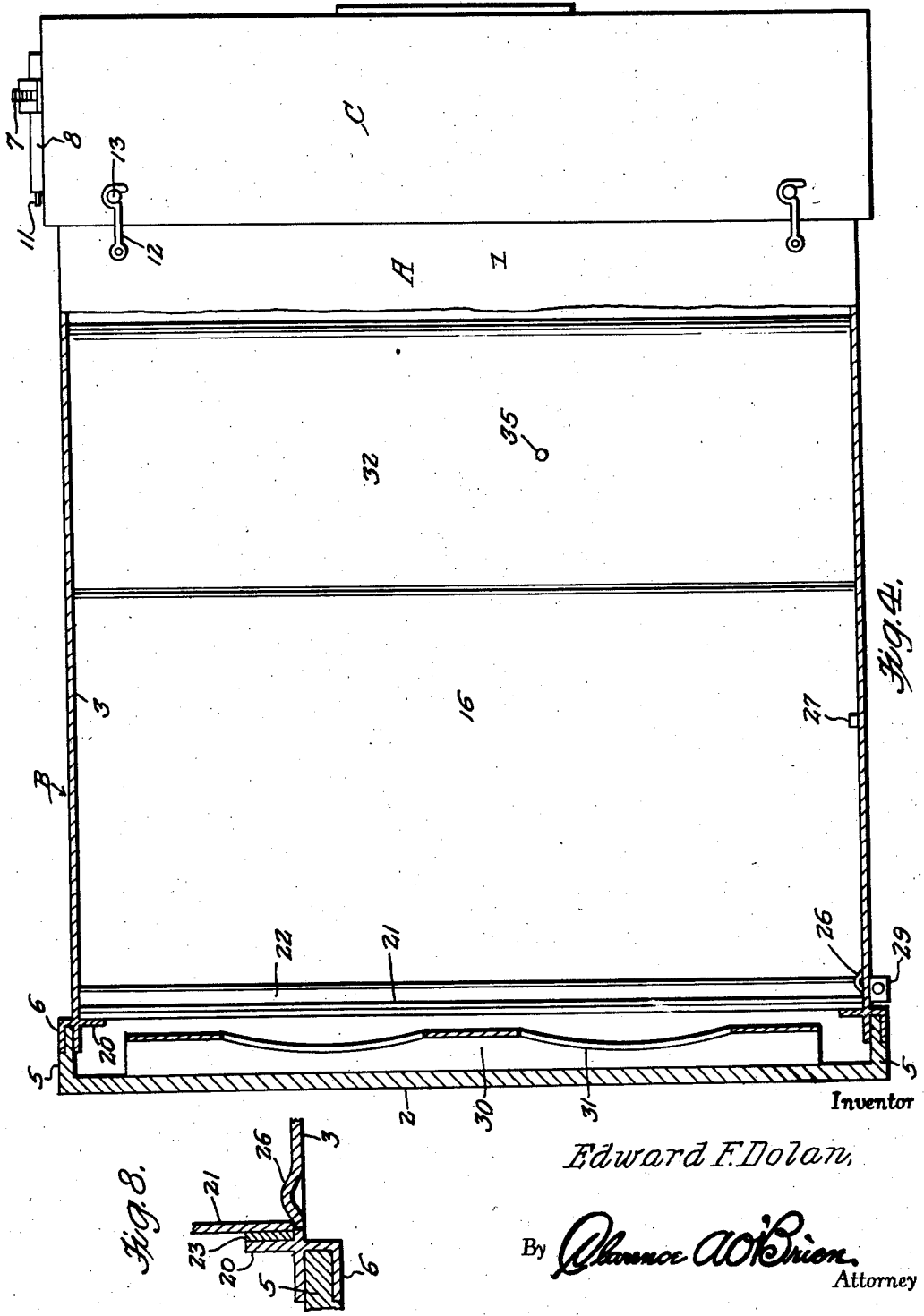
Inventor
Edward F. Dolan,
By *Clarence A. O'Brien*
Attorney

Patented Feb. 19, 1935

1,991,924

UNITED STATES PATENT OFFICE 1,991,924

CAMERA

Edward F. Dolan, Scranton, Pa., assignor, by direct and mesne assignments, of one-tenth to Harvey E. W. Bentele, Scranton, Pa., and four-fifths to Robert E. Dolphin, Scranton, Pa.

Application February 7, 1934, Serial No. 710,163

4 Claims. (Cl. 95—36)

This invention relates to a camera, the general object of the invention being to provide the camera with a pair of doors for covering that part of the film which is in exposed position so that by opening both doors, a full-sized picture can be taken when the exposure is made and by opening one door and having the other closed, a half-sized picture will be taken when the exposure is made. Then by closing the first door and opening the second, another half-sized picture can be taken so that two pictures will appear on the full-sized print.

Another object of the invention is to provide a space between the inner ends of the door so that by opening the shutter a third time after the two half-sized pictures have been taken, a clear line of division between the two half pictures will appear on the film to separate the two pictures.

Another object of the invention is to provide a pair of view finders, with means for covering one-half of each finder, after a half picture has been taken so that the camera can be focused on the remaining half of the view finder for taking the second half picture.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the improved camera, with the body part in section.

Figure 2 is a section on line 2—2 of Figure 1.

Figure 3 is a section on line 3—3 of Figure 1.

Figure 4 is a view taken at right angles to Figure 1 and showing parts in elevation and parts in section.

Figure 5 is a detail sectional view showing the means for rotatably supporting one of the roller knobs.

Figure 6 is a sectional view of the other knob.

Figure 7 is a section on line 7—7 of Figure 5.

Figure 8 is a section on line 8—8 of Figure 1.

In these drawings, the letter A indicates the receiving or outer body part which is composed of the two sides 1 and the back 2 and the letter B indicates the inner body member which includes the side parts 3 which have their edges fitting in grooves 4 formed in the inner faces of the side parts 1 of the body A. A pair of short side strips 5 is connected to the back 2 of the member A and the rear ends of the side members 3 of the body B are of channel-shaped form, as shown at 6, to receive the front edges of these strips, as shown in Figures 4 and 8.

The front of the camera is formed of a small casing C and contains the usual lens and shutter, the lever for the shutter being shown at 7, and this part carries the usual stops for regulating the amount of light entering the camera and this member also carries the two view finders 8, one of which is mounted on the top of the casing C and the other on one side thereof, in usual manner. Each transparent member of these view finders is divided into two halves by a line 9 and a pair of slides 10, preferably of red glass, is mounted in each view finder, these slides being movable by the handles 11 so that when a half picture has been taken, as will be hereinafter described, one of the slides can be moved over that half of the finder which has been used for taking said picture so that the operator can readily focus the camera in taking the next half picture on the other half of the transparent member of the finder.

This casing C is detachably connected to the body of the camera by the hooks 12 and the pins 13.

Figure 2 shows the barrel and the lens carried thereby at 14, it being understood that any type of lens can be used with the camera. The casing C is provided with a reduced part 15 which fits between the side members 1 of the body member A and the front ends of the side members 3 of the member B are fastened to the sides of this part 15. A pair of plates 16 is carried by the member B, and the front end of each plate is bent at right angles and connected to the part 15 and each plate extends to the rear of the member B where it is provided with an inwardly bowed rear end 17 which forms a space for a guide roller 18 for the film 19. Inwardly extending flanges 20 are formed on the channeled parts 6 of the side members 3 and form guiding means for the edges of the film as it passes from one guide roller 18 to the other.

A pair of doors 21 is each hingedly connected to the member B at the rear thereof and adjacent the part 17 of the plate 16, as shown at 22, and these doors have their side edges resting against gaskets 23 on the front faces of the flanges 20, as shown more particularly in Figure 8. The inner ends of the doors are spaced apart, as shown at 24, and these ends of the doors have the resilient strips 25 attached to their rear faces. A spring latch 26 is provided for holding each door in closed position and a similar latch 27 is provided for holding each door in open position. If desired, these latches 26 and 27 may be arranged in pairs and are struck from the members 3 and bent outwardly, as shown more particularly in Figure 8, and as shown in this figure a latch will hold the door against accidental movement, but will permit the door to be moved past the latch when pressure is exerted upon the hand lever 28 attached to a projecting end 29 of the hinge pin of each door.

A forwardly bowed member 30 is fastened to the back 2 of the member A and is formed with the openings 31 to add to the resiliency of the member 30 and this member tends to hold the film in the proper position between the two guide rollers 18.

The plates 16, adjacent their front ends, are each formed with an inwardly bowed part 32 of substantially semi-circular form and from this part the plates diverge rearwardly so as to permit the doors to be swung to open position without interfering with the path of the light rays passing from the lens to that part of the film stretched between the two guide rollers. Each semi-circular part 32 forms a space between itself and a side member 1 for the roll or spool 33 for the film. A spring 34 is fastened to the outer face of each semi-circular part 32 and has portions bearing against the film on the roll to prevent the film from becoming loose on the roll. Each spring 34 is of bowed shape with its ends engaging the film and its central portion fastened to the part 32 by a rivet 35.

One end of each spool is held in place by the sliding stud 36 and the other end of one spool is held in place by the shank 37 of a knob 38 rotatably arranged in a side member 3, the shank being provided with the usual projections 39 for engaging a slot in said end of the spool and the outer part of the shank has a pin 40 passing therethrough, which when the knob is pressed inwardly to engage the projections 39 with the spool and turned, will pass into the semi-circular channeled members 41, as shown in Figures 5 and 7. These members will prevent the shank from being pulled outwardly to release the spool, but when it is desired to pull the shank outwardly, this can be done by turning the knob until the pin 40 is in alignment with the spaces between the ends of the members 41, as shown in Figure 7. Then the knob can be pulled outwardly to release the spool.

The knob for one spool is placed at one side of the camera and the knob for the other spool is placed at the opposite side, and these parts are so arranged that either knob can be turned in either direction so that the film can be wound on either spool. Figure 6 shows another form of knob passing through a bushing 42 in a side member 3 and having a projection at its inner end, while its outer end is formed with a handle 43.

As will be seen, when the two doors are in open position, a picture of regular size can be taken either horizontally or perpendicularly. When it is desired to take two exposures on that part of the film extending between the two guide rollers, one door is raised and the other lowered and the exposure made in the regular way, but as approximately half of the film is covered by the closed door, the picture is taken on the other half of the film, the divided view finder, with the slide, facilitating the focusing of the camera in taking the half picture. After the exposure has been made, the open door is closed and the closed door opened and then another exposure is made to take a picture on the other half of the film. After the two pictures are taken, the second door is closed and then the shutter operated with the camera pointing toward the sky so as to expose that part of the film located between the spaced inner ends of the two doors. Thus when the film is developed and prints taken therefrom, the two separate pictures will appear on the prints with the pictures divided by a strip of the width of the space 24 between the inner ends of the two doors. It will, of course, be understood that the two exposures can be made with the camera in either one of its two positions or one picture can be taken horizontally and the other perpendicularly.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a camera, a pair of door hingedly arranged at the rear of the camera in front of the sensitized member, and manually operated means for moving each door to open position and out of the path of the light rays entering the camera, the inner ends of the doors reing slightly spaced apart when the doors are closed, for permitting the light rays entering the camera to strike that part of the sensitized member in rear of such space to provide a dividing space between the negatives or those portions of the sensitized member originally covered by the doors.

2. In a camera, a pair of doors hingedly arranged at the rear of the camera in front of the sensitized member, manually operated means for moving each door to open position and out of the path of the light rays entering the camera, the inner ends of the doors being slightly spaced apart when the doors are closed, for permitting the light rays entering the camera to strike that part of the sensitized member in rear of such space, and latch means located in the camera for holding the doors in open and closed positions.

3. In a camera of the class described, a member including a pair of sides and a back, a second member including a pair of sides slidably engaging the first mentioned sides, means at the rear ends of the sides of the second member for engaging parts of the first member, a front casing attached to the front ends of the sides of the second member, means for detachably connecting the front casing to the front ends of the sides of the first member, said front casing carrying the lens barrel, the shutter, and operating means for the shutter and a view finder, roller supporting means carried by the second member, guide rollers at the rear end of the second member for the film strip, a pair of doors hingedly connected at their outer ends in the rear part of the second member, means exterior of the camera for permitting the doors to be moved to open or closed position, said doors, when in closed position, extending in front of that part of the film strip located between the two guide rollers, the inner ends of said doors being spaced apart, latch means located within the camera for holding the doors in open and closed position, and a spring member carried by the rear part of the first member and engaging that part of the film strip extending between the guide rollers.

4. In a camera, a pair of light-excluding members adjustably located in the camera, means for adjusting each member from a position where the member covers the sensitized member to a position where the light rays can strike such member, said light-excluding members when in position covering the sensitized members having their inner ends spaced apart to permit light rays entering the camera to strike that part of the sensitized member in rear of such space to provide a dividing exposed portion on the sensitized member between the pictures taken on the rest of the member when the light-excluding members have been successively moved to uncovered position.

EDWARD F. DOLAN.